United States Patent [19]
Spekle et al.

[11] 4,219,426
[45] Aug. 26, 1980

[54] DIALYSIS DEVICE

[75] Inventors: Hendrikus J. Spekle, Arnhem; Johannes P. Brants, Oss, both of Netherlands

[73] Assignee: Organon Teknika B.V., Oss, Netherlands

[21] Appl. No.: 777,348

[22] Filed: Mar. 14, 1977

[30] Foreign Application Priority Data

Mar. 19, 1976 [NL] Netherlands .................. 7602880
Mar. 19, 1976 [NL] Netherlands .................. 7602881

[51] Int. Cl.² .................. B01D 31/00; A61M 1/03
[52] U.S. Cl. .................. 210/232; 210/32 B; 210/450; 210/456
[58] Field of Search ......... 55/158; 210/433 M, 321 R, 210/321 B, 450, 456, 232

[56] References Cited

U.S. PATENT DOCUMENTS

| | | | |
|---|---|---|---|
| 3,339,341 | 9/1967 | Maxwell et al. | 55/158 X |
| 3,698,560 | 10/1972 | Tapp et al. | 210/450 X |
| 3,832,830 | 9/1974 | Gerow | 55/158 |
| 3,933,646 | 1/1976 | Kahamaru et al. | 210/433 M X |
| 4,016,083 | 4/1977 | Sakaguchi et al. | 210/433 M |
| 4,031,012 | 6/1977 | Gics | 55/158 X |

FOREIGN PATENT DOCUMENTS

2267138 11/1975 France .................. 210/321 R

*Primary Examiner*—Frank A. Spear, Jr.
*Attorney, Agent, or Firm*—Stevens, Davis, Miller & Mosher

[57] ABSTRACT

The invention relates to a separating device, more particularly for hemodialysis, comprising a housing accommodating at least one bundle of a large number of tubular, selectively permeable membranes connected in parallel whose transverse dimensions are very small relative to their longitudinal dimensions. The ends of the membranes rest on supporting members in the housing. The membranes may be the walls of hollow fibers which divide the internal part of the separating device into a first medium space provided by the inside of the membranes and a second medium space inside the housing but outside the membranes. The medium spaces are each provided with an inlet and an outlet for respectively the supply and the discharge of a first and a second medium, which media can enter into exchange through the walls of the membranes.

16 Claims, 13 Drawing Figures

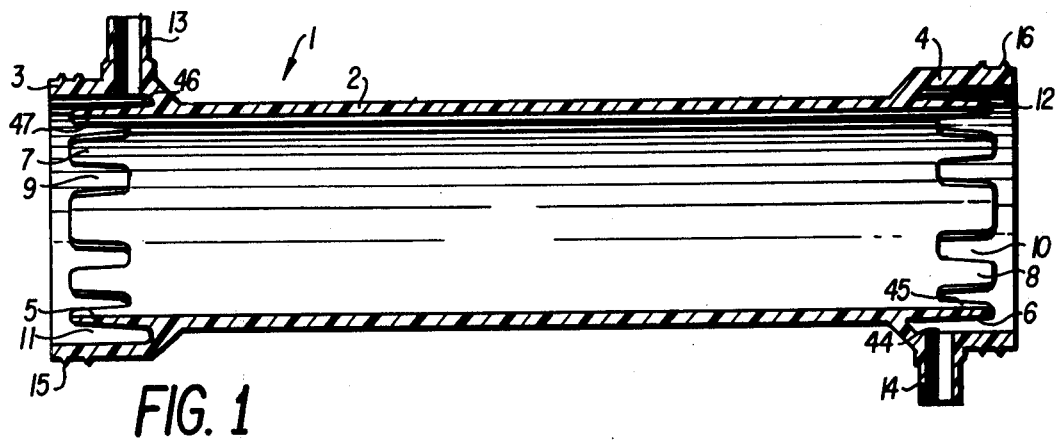
FIG. 1
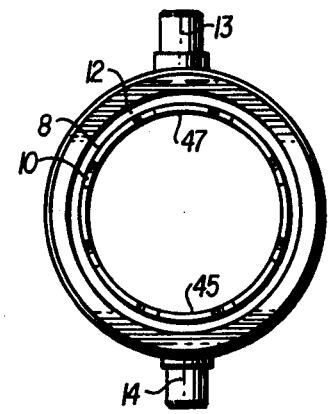
FIG. 2
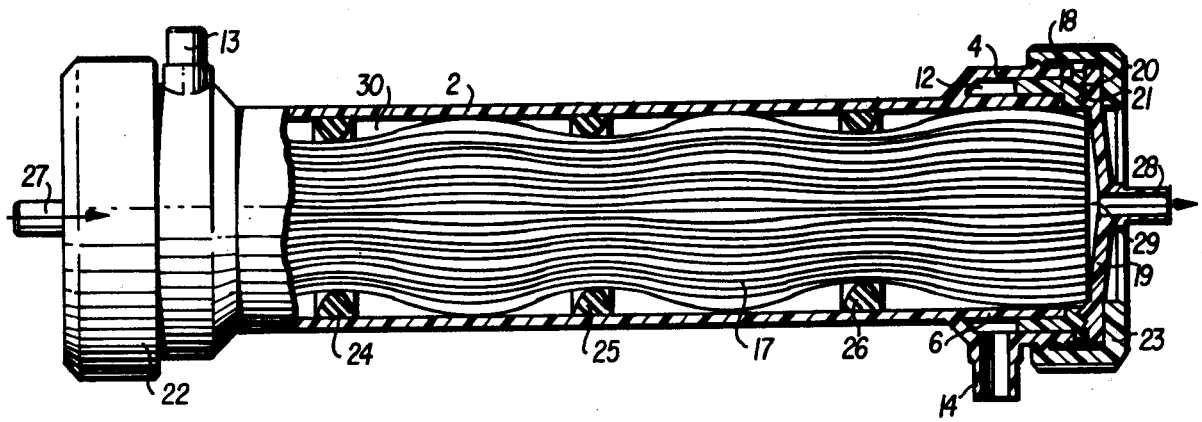
FIG. 4
FIG. 5
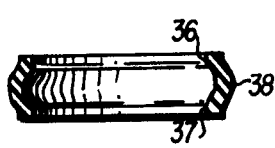
FIG. 6

DIALYSIS DEVICE

This invention relates generally to a separating device and, more particularly, to a device for use in hemodialysis.

BACKGROUND OF THE INVENTION

A dialyzer intended to be used as an artificial kidney is described by Abel, Rowntree and Turner in The Journal of Pharmacology and Experimental Therapeutics, Vol. V, 1913-1914, pp. 275-316. They passed blood taken from an artery of an animal through a number of tubular collodion membranes connected in parallel. Around the membranes there was kept up a flow of dialysate which served to discharge the low-molecular waste products extracted from the blood through the walls of the membranes. The purified blood was fed back to the animal through a vein.

Abel et al had thus laid the basis for the application of hemodialysis outside the body in the case of kidney deficiency. They realized that the use of tubular membranes offers considerable advantage, such as a favorable internal volume to surface area ratio. In this way there is formed a large exchanging membrane surface area in combination with a low blood volume and a short diffusion route, just as in the case of capillary blood vessels in kidneys.

The imitation of capillary blood vessels by artificially formed capillary membrane tubes has also been described by Huzella in Biochemische Zeitschrift 194,128 (1928).

A separating device comprising tubular membranes for isolating helium from gas mixtures is known from Bell Labs. Record, July 1958 No. 7, pp. 262-263, and French Patent specification No. 1,227,030.

There the membranes are formed by a bundle of glass tubes which have a high permeability for helium and a low permeability for other gases. For the separating power to be high the total surface area of the membranes should be large and their wall thickness small. To this end use is made of a very large number of fine, thin-walled glass capillaries, whose ends are embedded in supporting members of synthetic material. Owing to their very small diameter they are, in spite of their low wall thickness, resistant to large differences in pressure across their wall.

From the German Patent Application 1,226,988 laid open to public inspection there is known a separating device provided with spun capillary membranes, which may be used, inter alia, for hemodialysis.

In order that a largest possible membrane surface area may be obtained that may contribute to the exchange between the two media, the known devices of the type indicated above are so constructed that the tubular membranes are preferably not additionally supported in the space between the supporting members.

SUMMARY OF THE INVENTION

It is an object of this invention to provide a dialysis device of the general type described which is more efficient than the prior art devices. Another object of the invention is to improve the efficiency of a hemodialysis device using a bundle of fibers submerged in a dialysis fluid.

BRIEF DESCRIPTION OF THE INVENTION

Other objects of the invention will become apparent from the following description with reference to the accompanying drawing wherein FIG. 1 is a sectional view of the housing of an artificial kidney according to the invention;

FIG. 2 is a cross-sectional view of the housing of the artificial kidney according to FIG. 1;

FIG. 3 is a view partly in side elevation and partly in section of an artificial kidney comprising a bundle of tubular membranes accommodated in the housing according to FIG. 1;

FIGS. 4 through 8 are sectional views of different embodiments of constructions that may be used for supporting the bundle of membranes in the housing of the artificial kidney according to FIG. 3;

DETAILED DESCRIPTION OF THE INVENTION

Figure 7:
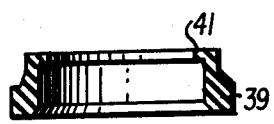

The foregoing objects and others are accomplished in accordance with this invention by providing a separating device for hemodialysis or the like, comprising a housing accommodating at least one bundle of a large number of tubular, selectively permeable membranes connected in parallel whose transverse dimensions are very small relative to their longitudinal dimensions and whose ends rest on supporting members, which membranes divide the internal part of the separating device into a first medium space provided by the inside of the membranes and a second medium space inside the housing but outside the membranes, which medium spaces are each provided with an inlet and an outlet for respectively the supply and the discharge of a first and a second medium, which media can enter into exchange through the walls of the membranes.

By contrast, with the prior art devices, the separating device according to the invention is characterized in that in the space between the supporting members the bundle of membranes bears against at least one constriction placed against the inner wall of the second medium space of the housing, which constriction substantially extends in circumferential direction about the bundle.

Although it might be expected that this support would unfavorably influence the efficiency of the exchange of matter, the opposite was found to be the case.

Surprisingly, improved efficiency is obtained with a bundle which is circumferentially supported at several points by constrictions. The favorable effect of the constriction may be due to the fact that at the restriction(s) the medium in the second medium space has to find its way through the bundle. Thus the second medium, at least at the restriction(s), is forced into the closest possible contact with the membranes, which may promote the exchange of matter with the first medium.

The separating device according to the invention particularly relates to a construction in which the first medium space serves to pass through the first medium and the second medium space to pass through the second medium substantially in longitudinal direction of the bundle.

For the constriction various constructions are conceivable. For instance, the inner wall of the housing may be provided with one or more helical ribs against which the bundle bears. However, to prevent the second medium from partly following a preferred route around the bundle, namely the helical path in the space between the outside of the bundle and the inner wall of the housing, it is recommended that at some points the second medium should be made to flow radially inwards. Such a flow may be insured by providing cross ribs between successive pitches of a helical rib. The helical rib may be formed integral with the inner wall of the housing, but also may be placed against it as a separate member.

A suitable construction of the separating device according to the invention is characterized in that the constriction is annular. No preferred flow of the second medium is to be expected then. Nor need any provisions be made to prevent such a preferred flow.

Although it is quite conceivable for the ring(s) and the housing to be constructed in one piece, so that the ring forms a shoulder or collar in the housing, a construction is yet preferred in which the constriction is formed by a ring which is separately mounted in the housing. For in that case it is possible, while using the same housing, for the dimensions of the ring to be adapted to the diameter of the used bundle of membranes.

Another construction of the separating device according to the invention is characterized in that the ring is provided with an elastic part which bears against the circumferential surface of the bundle. In this way, allowance is made for some variation in the outer diameter of the bundle, so that it will always bear satisfactorily against the ring.

It is preferred that the entire ring should be of an elastic material.

The invention also relates to an apparatus for hemodialysis of one of the above-described constructions, in which the first space is provided with an inlet and an outlet for blood and the second space with an inlet and an outlet for dialysis liquid.

In FIG. 1 the numeral 1 refers to a cylindrical polystyrene housing for a hollow-fiber artificial kidney whose construction is further shown in FIG. 3. The housing 1 has an elongated tubular member 2 and substantially concentric ring members 3,4 at the opposite end thereof, which provide expanded end members of larger diameter than that of tubular member 2. Within the expanded end portions 3,4, the end portions 5,6 of tubular member 2 form a continuation of the tubular member 2. The end portions 5,6 are provided with regularly circumferentially spaced, axially extending crenels 7,8,45 and 47 (See also FIG. 2). The spaces between the circumferentially spaced crenels 7,8,45 and 47 form passages for dialysis liquid, as will be further described with reference to FIG. 3. Two of these passages are indicated by the reference numerals 9,10. Annular spaces 11 and 12 are dispersed between the end portions 5 and 6 of tubular member 2 and annular concentric ring members 3 and 5, respectively. Inlet and outlet connections 13, 14 communicate with annular spaces 11 and 12; respectively. Conduits 13 and 14 are secured to ring members 3 and 4, respectively. The mouths of the conduits 13,14 are indicated by 46 and 44, respectively. End ring members 3, 4 are provided with screw threads 15 and 16 on their external surfaces so that they can be provided with means for closing the housing 1 of the artificial kidney.

FIG. 3 is a more detailed representation of the construction of the artificial kidney.

A large number, say 8000 or more, of hollow cupramonium cellulose fibers 17 which form an equally large number of permselective membranes are disposed in tubular member 2. The hollow fibers 17 have an inner diameter of 215 $\mu$m, a wall thickness of 16 $\mu$m and a length of 250 mm. The ends of the hollow fibers 17 are assembled into a bundle and are embedded in similar supporting members of which only the right-hand supporting member 18 is visible in FIG. 3. The supporting members are of a somewhat elastic synthetic polymer material which, after the fiber bundle has been placed in the housing 1, is poured around the fiber ends and subsequently cured. As in shown in FIG. 3, the synthetic material fills part of each of the passages such as 9, 10 formed between the crenels 7, 8, 45 and 47. In this way the bundled fibers 17 are prevented from rotating. The supporting members partly project beyond the widened end portions provided by rings 3 and 4, as is shown by the right-hand end portion 4. Against the end faces of the supporting members there are placed headers 19 (FIG. 3) provided with blood connection conduits 27, 28. The headers 19 have two inwardly projecting circular ridges or rings, the inner one of which projects axially inwardly farther than the radially center one. These ridges, the ones for the header 19 being indicated by 20 and 21, are forced into the supporting members by the pressure exerted by the collars 22, 23 when they are screwed on the expanded end members 3, 4.

The fiber bundle 17 is additionally supported in tubular member 2 in a number of places by elastic rings 24, 25, 26 placed against the inner wall of member 2. Each of these rings 24, 25 and 26 is of a soft or supple rubber and forms a constriction of the dialysis space 30. Space 30 is enclosed by tubular member 2 of housing 1 and is the space which is not taken up by the hollow fibers 17. The peripheral surface of the bundle of fiber 17 lies against the insides of the rings 24, 25, 26.

Various other embodiments of the supporting rings are shown in the FIGS. 4 through 8. Each of these rings is made of a supple and resilient rubber suitable for biological applications. In the construction according to FIG. 4 the supporting ring has a flange 31 and a conical part 32. The flange 31 comes to rest against the inner wall of the housing of the artificial kidney, the lower end of the conical part 32 against the circumferential surface of the bundle 17. In the constructions according to the FIGS. 5 and 6 the rings are axisymmetrical. With the one according to FIG. 5 the circumferential surface of the fiber bundle rests against the cylindrical middle portion 33, and the edges 34 and 35 of the construction according to FIG. 6 has its inner edges 36, 37 bearing against the circumferential surface of the bundle, whereas the cylindrical outer edge 38 will come to lie against the inner wall of the housing.

Figure 8:
Figure 9:
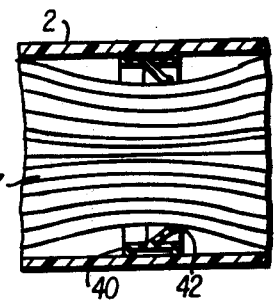
FIG. 9 shows a part of the artificial kidney according to FIG. 3 provided with supporting members according to FIG. 8.

In the constructions according to the FIGS. 7 and 8 the outer edges of the flange parts 39 and 40, respectively, lie against the inner wall of the housing, whereas the thin parts 41 and 42, respectively, rest against the circumferential surface of the fiber bundle. Of importance for all constructions is that the rings are so deformable that within a reasonable range of the bundle diameter the rings are in proper contact with the outer circumference of the bundle and the inner wall of the housing. An excellent construction in this respect is the one illustrated in FIG. 8. FIG. 9 shows how this ring deforms under the influence of the bundle of fibers 17 placed in it. This figure illustrates a detail of the artificial kidney of FIG. 3, in which figure, however, the rings 24–26 are of the construction shown in FIG. 8. The advantage of the readily deformable, thin part 42 is that the support does not cause the bundle to be unduly compressed. Both in the construction according to FIG. 3 and in that according to FIG. 9 the artificial kidney is so assembled that the rings are placed in the housing first and then the bundle of fibers 17. The rings fit in the housing so that in the next stages of the assembly they do not move out of their position. However, it is also possible for the fiber bundle to be provided first with rings before placing it in the housing. In that case, it is recommended that use should be made of a ring of which the resilient part is not situated on the inside but on the outside. To this end, use may be made of a ring as shown in FIG. 8, which should then be so formed, however, that its part 42 is situated on the outside and its "flange" 40 on the inside.

A further advantage of the restrictions in the second medium space is obtained by centrifugal casting the supporting members in a special way. Centrifugal casting may be carried out in such a way that during the casting of the supporting members, the separating device is rotated about an axis of symmetry positioned transverse to the bundle. A larger number of supporting members may be cast at once, however, it use is made of a rotating disk, at the periphery of which there are placed the separating devices with the axes of their bundles being radially directed relative to the disk. The resulting tendency in that case of the bundles to bend and axially shift under the influence of the forces acting on it will be counteracted then by the centering effect of the constrictions.

In the dialysis treatment of a patient with a defective kidney, the artificial kidney is connected to an artery and a vein of the patient via the blood connections 27, 28. The blood flowing from an artery enters the artificial kidney via one, say 27, of the blood connections. It first enters the blood chamber positioned between the respective header and the opposite supporting member.

Subsequently, it flows through the open ends into the hollow fiber 17 which end in this chamber 29 and the blood connection 28 positioned at its other end.

The blood is then returned to the patient through a vein. In order that the blood may be purified as it passes through the artificial kidney, dialysis liquid is supplied through one of the conduits 13, 14. Supposing that the dialysis liquid flows in through the conduit 14, then it will first fill the annular chamber 12, which is promoted by placing a crenel, such as 45 (See also FIG. 2) opposite the mouth 44 of the conduit 14. The annular chamber 12 is bounded by the left-hand end surface of the supporting member 18, the crenels 8, etc., of the end portion 6 and the concentric ring member 4. From the chamber 12 the dialysis liquid flows through the passages 10 between the crenels into the dialysis space 30, of the artificial kidney, which is the space inside the housing 1 that is not taken up by the hollow fiber 17. The dialysis liquid now flows past the fiber in a direction opposite to that of the blood. At the rings 24, 25 and 26 the dialysis liquid flowing near the inner wall of the housing 1 is forced to flow towards the middle of the fiber bundle.

During its passage through the dialysis space 30 the dialysis liquid extracts from the blood waste products which can pass through the selectively permeable walls of the hollow fibers. The dialysis liquid finally leaves the artificial kidney through the connection 13. The purified blood issuing from the connection 28 is fed back to the patient through a vein. The above-described construction has the advantage that on its way into or out of the device the dialysis liquid will be forced to flow evenly around the fiber bundle. So the dialysis will be more effective in that the dialysis liquid will not tend to follow preferred routes in the dialysis space.

A further advantage consists in the proper centering of the fiber bundle during the centrifugal casting of the supporting members. In both methods of centrifugal casting referred to above, the ends of the bundle are satisfactorily kept in their position by the inner walls 5 and 6 of the annular chambers 11 and 12, respectively. This way of supporting the ends of the bundle in combination with the supporting of the bundle between its ends, such as by means of the rings 24, 25 and 26, lends itself excellently for the centrifugal casting of the supporting members by the second method indicated above. The tendency then of the bundle to bend and axially shift under the influence of the forces acting on it will be counteracted. Moreover, the above-discussed construction offers the advantage of the supporting members being fixed in the shell, so that they cannot shift in following stages of their assembly, for instance when the collars 22, 23 are screwed on.

Figure 10:
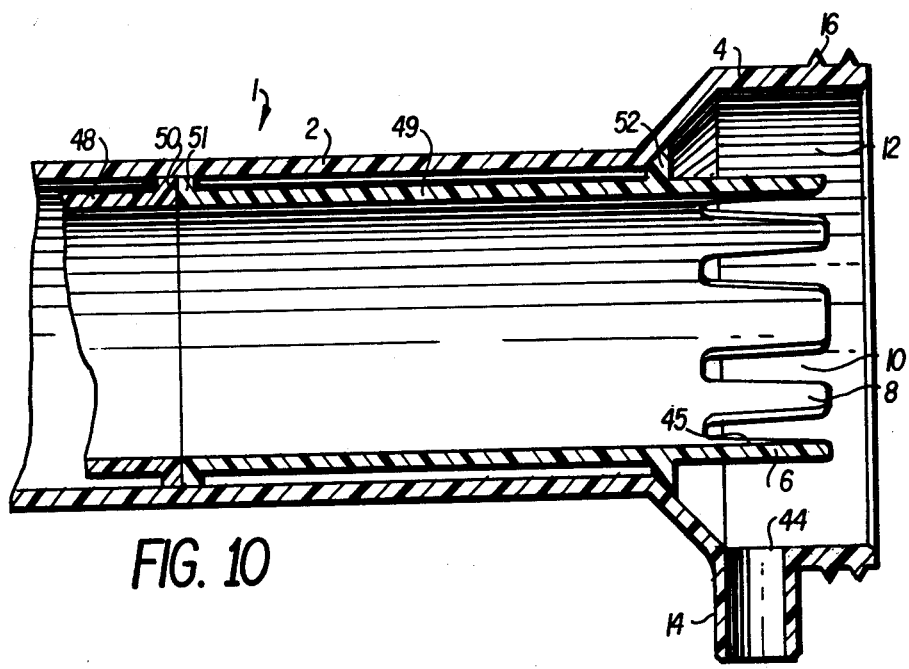
FIG. 10 is a varient embodiment of the housing according to FIG. 1.

The present invention is not limited to the construction given in the FIGS. 1 through 3, in which the annular chamber is formed integral with the housing. For instance, it is also possible for the housing to accommodate one or more parts whose ends provided with passages serve as inner walls of the annular dialysate chambers. An embodiment of such a construction is represented in FIG. 10. In it like parts are referred to by the same numerals as used in FIG. 1.

In the construction shown in FIG. 10 the housing 1 accommodates an inner sleeve 50 consisting of two identical parts 48, 49. In FIG. 10 the part 48 is shown entirely. It is provided with a straight-edged flange 51 and a bevelled flange 52, which bear against the inner wall of member 2 and the oblique part of the concentric ring member 4, respectively. The right-hand end portion of the sleeve part 49 extending beyond the bevelled flange 52 is again provided with crenels 8 having passages 10 for the dialysis liquid. The extended end portion of tubular member 2 forms the inner wall of the annular dialysate chamber 12, whose outer wall is formed by the inner wall of member 4. The remainder of the artificial kidney of FIG. 10 is identical to that shown in FIG. 3.

As a result of the provision of the annular chambers 11 and 12 shown in FIGS. 3 and 10, the dialysis liquid is forced first to flow tangentially around the fiber bundle before flowing in an axial direction via the passages provided around the fiber bundle. When the dialysis liquid arrives at the opposite end of the bundle, it will first have to flow through the passages in the annular chamber before it can leave the separating device via the annular chamber and the outlet in the housing.

It should be added that FIG. 3 of the German Application 2,444,540 laid open to public inspection represents a hollow-fiber artificial kidney in which the connections for the dialysis liquid communicate with annular spaces around blood chambers which connect with the ends of the hollow fibers. This known artificial kidney, however, does not have an annular chamber whose inner wall is provided with passages. In the known artificial kidney the annular spaces are in direct communication with the intermediate space in the housing of the artificial kidney. With this known device there is consequently also the disadvantage of the dialysis liquid channeling and following preferred routes, as a result of which the effect of the dialysis is reduced.

EXAMPLE

The results obtained with an artificial kidney of the construction illustrated in FIG. 3, but provided with two rings of the type shown in FIG. 8 were compared with those obtained with the same artificial kidney without rings. The bundle was composed of 12,000 hollow fibers of cellulose regenerated from cupramonium solution each having an inner diameter of 215 μm, a wall thickness of 16 μm and a length of 250 mm. The internal diameter of the middle part 2 of the housing was 50 mm; the length of the part of the dialysis space 30 available for dialysis was 220 mm.

The two rings were so placed in the housing that they divided the dialysis space 30 into approximately 3 equal parts. They were made of an EPT synthetic rubber (ethylene propylene terpolymer) and in the non-assembled state had a round opening in the part 42 of 38 mm in diameter. An aqueous salt solution was passed through the fibers at a flow rate Qb of 200 ml/min. The moment the salt solution entered the fibers it had a concentration $C_i$ of 0.6 grams of NaCl per liter of demineralized water. Through the dialysis space 30, fresh demineralized water was passed in countercurrent flow at a rate of 500 ml/min.

The NaCl concentration of the salt solution issuing from the artificial kidney was measured ($C_u$) and subsequently the efficiency $\eta = C_i - C_u$ and the salt clearance $= \eta \times Q_b$ were determined. The experiments were carried out on at least 10 devices of each of the two constructions.

With the construction provided with rings the efficiency $\eta$ was found to be between 0.65 and 0.75, and the salt clearance was consequently in the range of 130 to 150 ml/minute.

With the construction without rings, however, the efficiency $\eta$ was found to be between 0.55 and 0.65 and the salt clearance was consequently in the range of 110 to 130 ml/minute.

Figure 11:
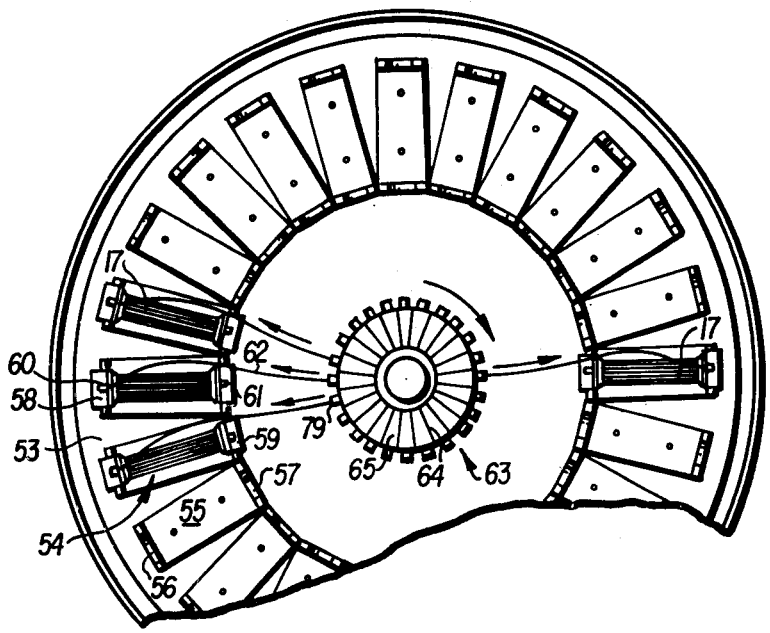
FIG. 11 is a top view of an apparatus for the centrifugal casting of the supporting members of the artificial kidney according to FIG. 3.
Figure 12:
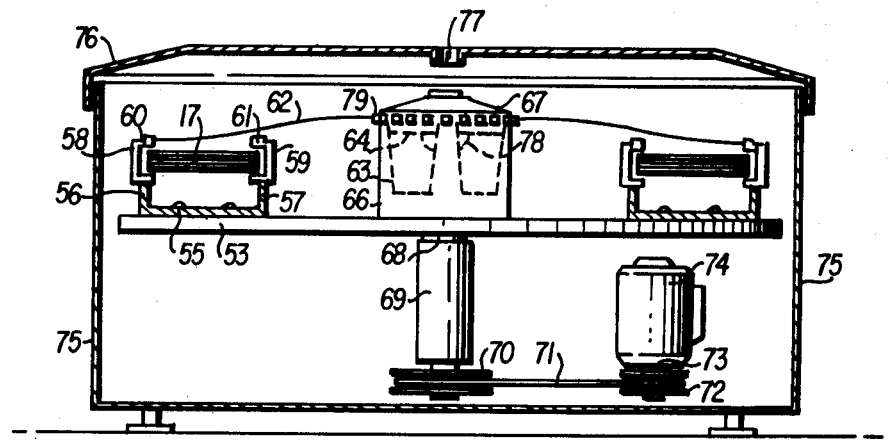
FIG. 12 is a side elevation of the apparatus of FIG. 11.
Figure 13:
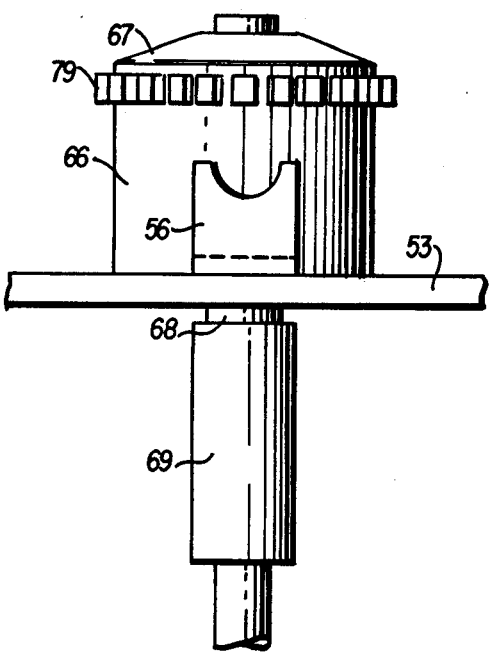
FIG. 13 shows a detail of the apparatus according to FIG. 12.

The FIGS. 11, 12 and 13 show a preferred embodiment of an apparatus for the centrifugal casting of the supporting members of the hollow-fiber artificial kidneys. The artificial kidneys are of the construction illustrated in FIG. 3, but are only very schematically shown in the FIGS. 11 and 12. The numeral 53 refers to a rotatable disk on which there are placed a number of artificial kidneys 54. FIG. 11 only shows three artificial kidneys. The artificial kidneys are equidistantly disposed about the periphery of the rotatable disk with the longitudinal axes of their bundles of fibers 17 radially extending relative to the rotatable disk. As is visible in the side elevations shown in FIG. 12, the artificial kidneys are supported by holders 55 which are mounted on the rotatable disk 53. The holders 55 are each provided with two raised edges 56, 57 which carry the molds 58, 59 for the supporting members of the bundles of fibers 17. The molds 58, 59 contain the end ring members (3, 4 in FIGS. 1 and 3) of an artificial kidney. The molds 58, 59 are in the form of caps at the top of which there are provided recesses 60 and 61, respectively, which accommodate the end of a tube, such as 62 in FIGS. 11 and 12, for the supply of casting material.

The tubes 62 have their other ends connected to a supply vessel 63 which is fixedly mounted in the center of the rotatable disk 53. The connections of the tubes 62 to the supply vessel 63 are indicated by the reference numeral 79. The supply vessel 63 is provided with radially positioned partitions 64 which divide the supply vessel into a number of compartments 65, i.e. one compartment to each tube 62. At one of its top corners each partition is provided with an overflow recess 78. The supply vessel 63 is accommodated in a cylindrical housing 66 provided with a lid 67. The rotatable disk 53 is provided with a driving shaft 68 which runs through a shaft box 69 (See FIG. 12). On the free end of the driving shaft 68 there is mounted a rope sheave 70 on which there is laid a rope 71, which is driven by a rope sheave 72.

The latter is placed on the shaft 73 of an electric motor 74. The entire apparatus is accommodated in a centrifuge housing 75 provided with a cover 76. The cover 76 may be provided with an opening 77 for the passage of casting material to the supply vessel 63, optionally through an opening provided in the lid 67.

The centrifugal casting apparatus operates as follows. The artificial kidneys whose bundle ends are to be embedded are placed in the holders 55 along with the casting caps 58, 59. The ends of the tubes 62 are inserted in the recesses 60 of the outwardly positioned casting caps 58. The material for the supporting members (18 in FIG. 3) is poured into the supply vessel 63. The casting material is fed in such an amount that it runs over the overflow recesses 78, so that all compartments are filled to the same level. Subsequently, the drive motor is started and the rotatable disk 53 carrying the artificial kidneys will begin to rotate. Under the influence of the then prevailing centrifugal force the casting material will go up the outer wall of the supply vessel 63 and will then flow through the tubes 62 to the casting caps 58.

In the casting caps 58 the casting material will spread around the bundle ends and will also penetrate between the ends of the separate hollow fibers. Any differences in contents among the compartments will be eliminated in that during rotation the casting material will rise to above the edges of the partitions. Any surplus of casting material in a given compartment will then be distributed over the adjacent compartments. Once the material is sufficiently cured, the drive motor 74 is stopped. The tubes 62 are detached from the caps 58, and the artificial kidneys with the caps 58, 59 are removed from the holders 55, turned through 180° and subsequently fixed in the holders 55. The free ends of the tubes 62 are then inserted into the recesses 61 of the casting caps 59.

After supply vessel 63 has been refilled, the casting of the supporting members of the other ends of the fiber bundles may be attended to.

The centrifugal casting need not necessarily be performed with a supply vessel divided into compartments. Use may also be made of a supply vessel without partitions. However, in view of an even distribution of the casting material over the artificial kidneys, it is required then to gradually supply the casting material to the supply vessel during centrifuging. Therefore, the centrifugal casting process as described with reference to FIGS. 11, 12 and 13, in which the supply vessel 63 is divided into compartments, is yet to be preferred, because in that case the filling of the supply vessel can take place prior to centrifugal casting.

A suitable composition of the polyurethane casting compound consists of a polyol mixture and an isocyanate of the MDI type (diphenyl methane diisocyanate).

The compound may then be composed as follows:

A. 80% by weight of Nourypol 200 from Akzo Chemie (having a basis of soy bean oil); equivalent weight about 280; 20% by weight of Desmophen 3600 from Bayer (having a basis of polypropylene oxide); equivalent weight about 1000;

B. An isocyanate having a basis of MDI, marketed by Upjohn under the trade name Isonate 143 L; equivalent weight about 144. Of this substance 44 to 53 parts by weight per 100 parts by weight of the polyol mixture (corresp. to 100 to 120% equivalents).

The preparation of the composition is carried out in the presence of a conventional catalyst, and preferably one prepared from an iron compound. Depending on the reaction temperature these mixtures have a gel time of from 2 to 20 minutes.

Although in the embodiment according to FIGS. 11, 12 and 13 only one row of artificial kidneys is provided with supporting members, it is also conceivable to superimpose a number of artificial kidneys, so that several rows of artificial kidneys may be treated simultaneously. In that case each row may have its own supply vessel.

Instead of hollow fibres made of cupramonium cellulose, fibres of other materials suitable for dialysis purposes may be used, e.g. of cellulose acetate (entirely or partly hydrolysed), polyacrylate, polycarbonate, polysulfone. Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A dialysis device comprising
an elongated tubular member,
a ring with a diameter larger than the diameter of the tubular member and disposed in concentric overlapping arrangement about each end portion of the tubular member secured thereto in radially outwardly spaced relationship to form an annular space therebetween, each end portion of said tubular member having circumferentially spaced crenels,
a bundle of hollow regenerated cellulose fibers disposed in the tubular member with ends disposed adjacent the ends of the tubular member,
longitudinally-spaced annular soft rubber-like rings substantially impassable to a liquid passing through said device and disposed in the tubular member about the bundle,
a solid elastomeric composition filling voids about the ends of the fibers and sealing the ends of the tubular member against longitudinal liquid flow therefrom, said composition also sealing the open ends of said annular space but not sealing all of the spaces between crenels whereby liquid can flow from an annular space into the space about the fibers in the tubular member at one end of the tubular member and out of the space in the tubular member into the annular space at the opposite end of the tubular member,
means for introducing dialysis fluid into one annular space,
means for removing dialysis fluid from the other annular space to create flow of dialysis fluid in the tubular member about the fibers,
convex disks having an annular prong near their peripheral edges impressed in said elastomeric composition radially outwardly from the fibers sealing a space between the disk and the end of the fiber bundle, said disks being end closure members for the tubular member,
means for the flow of blood into one of the last said spaces and into the fibers, and
means for the flow of blood from the second of the last said spaces.

2. A separating device, adapted for hemodialysis, comprising
an elongated tubular housing,
at least one bundle of a large number of parallel, hollow, selectively permeable fibers accommodated in said housing, whose ends are disposed adjacent the ends of the housing,
supporting members embedding the ends of said hollow fibers, and formed of a solid synthetic polymeric casting composition filling voids about the ends of the fibers and sealing the ends of said tubular housing,
a blood space provided by the inside of said hollow fibers,
a dialysis space located inside said housing but outside said hollow fibers,
inlets provided with said blood space and said dialysis space for the supply of blood and dialysis liquid thereto, respectively, which media can enter into exchange through the walls of said hollow fibers,
outlets provided with said blood space and said dialysis space for the discharge of blood and dialysis liquid therefrom, respectively,
at least one ring-like constriction substantially impassable to said dialysis liquid and placed in a manner wherein the exterior surface of said constriction contacts the inner wall of the dialysis space of said housing, at least part of said constriction being elastic, said elastic part bearing against said bundle and substantially extending in a circumferential direction about said bundle, but only partly along the length of the bundle(s), and
convex disks having an annular prong near their peripheral edges impressed in said polymeric casting composition radially outwardly from the fibers sealing a space between a disk and the end of the fiber bundle, said disks being end closure members for the tubular housing.

3. A separating device according to claim 2, characterized in that the first medium passes through the first medium space and the second medium passes through the second medium space substantially in a longitudinal direction of the bundles.

4. A separating device according to claim 2, characterized in that the ring-like constriction is of an elastic material.

5. An apparatus according to claim 2, characterized in that the hollow fibers are of cupramonium cellulose.

6. An apparatus according to claim 2, characterized in that the hollow fibers have an outer diameter not exceeding 400 μm.

7. The separating device of claim 2, wherein the tubular housing comprises a middle portion ending in expanded end portions which form the outer walls of annular chambers connecting with the inlet and the outlet of the dialysis space, the inner walls of said annular chambers being provided with a number of circumferentially spaced passages by which the annular chambers communicate with the dialysis space, which inner walls partly extend into the supporting members.

8. An apparatus according to claim 7, characterized in that the inner walls of the annular chambers are provided with axially projecting crenels.

9. An apparatus according to claim 7, characterized in that the inner walls of the annular chambers are formed by parts of the middle portion of the housing extending to within the expanded end portions.

10. An apparatus according to claim 7, characterized in that the housing comprises an outer sleeve inside which there is positioned a separate inner sleeve and the inner walls of the annular chambers are formed by the crenellated ends of the inner sleeve.

11. A device for hemodialysis in which the first space communicates with two blood distribution chambers that connect with an inlet and an outlet for blood according to claim 7, characterized in that the annular chambers connect with an inlet and an outlet for dialysis liquid.

12. An apparatus according to claim 7, characterized in that the inlet opening of the second space is formed by the mouth of a feed channel directed transverse to the bundle.

13. An apparatus according to claim 12, characterized in that the mouth of the feed channel is positioned opposite a part of the inner wall of an annular chamber, which part is located between two passages.

14. An apparatus according to claim 7, characterized in that the outlet opening of the second space is formed by the mouth of a discharge channel directed transverse to the bundle.

15. An apparatus according to claim 14, characterized in that the mouth of the discharge channel is positioned opposite a part of the inner wall of an annular chamber, which part is located between two passages.

16. An apparatus according to claim 7, characterized in that the hollow fibers have a wall thickness not exceeding 100 $\mu$m.

* * * * *